(12) United States Patent
Outlaw et al.

(10) Patent No.: US 10,056,198 B2
(45) Date of Patent: Aug. 21, 2018

(54) VERTICALLY ORIENTED GRAPHENE NANOSHEETS ON ALUMINUM ELECTRODES

(71) Applicant: College of William and Mary, Williamsburg, VA (US)

(72) Inventors: Ronald A. Outlaw, Williamsburg, VA (US); Dilshan V. Premathilake, Newport News, VA (US)

(73) Assignee: College of William & Mary, Williamsburg, VA (US)

( * ) Notice: Subject to any disclaimer, the term of this patent is extended or adjusted under 35 U.S.C. 154(b) by 15 days.

(21) Appl. No.: 15/434,204

(22) Filed: Feb. 16, 2017

(65) Prior Publication Data

US 2017/0236655 A1    Aug. 17, 2017

Related U.S. Application Data

(60) Provisional application No. 62/362,732, filed on Jul. 15, 2016, provisional application No. 62/296,168, filed on Feb. 17, 2016.

(51) Int. Cl.
*H01G 9/045* (2006.01)
*H01G 11/36* (2013.01)
*H01G 11/86* (2013.01)
*H01G 9/00* (2006.01)
*H01G 11/46* (2013.01)

(52) U.S. Cl.
CPC .......... *H01G 11/36* (2013.01); *H01G 9/0029* (2013.01); *H01G 9/045* (2013.01); *H01G 11/46* (2013.01); *H01G 11/86* (2013.01)

(58) Field of Classification Search
CPC ........ H01G 9/045; H01G 11/36; H01G 11/46; H01G 11/72; H01G 11/86; B82Y 30/00
USPC .......... 252/508, 500; 361/502; 977/742, 810
See application file for complete search history.

(56) References Cited

U.S. PATENT DOCUMENTS

| | | |
|---|---|---|
| 7,623,340 B1 | 11/2009 | Song |
| 7,852,612 B2 | 12/2010 | Wang |
| 8,153,240 B2 | 4/2012 | Wang |
| 9,437,369 B2 | 9/2016 | Miller |
| 9,505,624 B2 | 11/2016 | Liu |
| 2009/0047520 A1* | 2/2009 | Lee ........................ B82Y 15/00 428/408 |

(Continued)

FOREIGN PATENT DOCUMENTS

| | | | | |
|---|---|---|---|---|
| CN | 102568853 A | * | 7/2012 | ............. H01G 9/042 |
| CN | 201420585008 | * | 10/2014 | ............. H01M 4/13 |

OTHER PUBLICATIONS

Miller et al., Graphene Double-Layer Capacitor with AC Line-Filtering Performance, Science, 2010, pp. 1637-1639, vol. 329.

(Continued)

*Primary Examiner* — Tri V Nguyen
(74) *Attorney, Agent, or Firm* — Jason P. McDevitt

(57) ABSTRACT

Novel compositions of vertically oriented graphene nanosheets on aluminum electrodes are provided. These compositions are particularly useful for advanced electrolytic capacitors and fast response electric double layer capacitors. These compositions include a polycrystalline carbon layer, and an adjacent aluminum oxide layer that does not preclude ohmic contact between the carbon layer and an aluminum substrate.

5 Claims, 6 Drawing Sheets

(56) References Cited

U.S. PATENT DOCUMENTS

2011/0070488 A1* 3/2011 West ........................ H01M 4/04
                                                                   429/209
2014/0313636 A1* 10/2014 Tour ........................ H01G 11/72
                                                                   361/502

OTHER PUBLICATIONS

Miller et al., Vertically-Oriented Graphene Electric Double Layer Capacitor Designs, J. Electrochem. Soc., 2015, pp. A5077-A5082, vol. 162.

* cited by examiner

VERTICALLY ORIENTED GRAPHENE NANOSHEETS ON ALUMINUM ELECTRODES

CROSS-REFERENCE TO RELATED APPLICATIONS

The present application claims priority under 35 U.S.C. § 119(e) to (i) U.S. Provisional Patent Application No. 62/362,732, filed Jul. 15, 2016, and (ii) U.S. Provisional Patent Application No. 62/296,168, filed Feb. 17, 2016. The disclosures of these applications are incorporated by reference herein.

STATEMENT REGARDING FEDERALLY SPONSORED RESEARCH OR DEVELOPMENT

Not applicable.

FIELD OF INVENTION

The present application relates to novel compositions of vertically oriented graphene nanosheets on aluminum electrodes. These compositions are particularly useful for advanced electrolytic capacitors and fast response electric double layer capacitors.

BACKGROUND

An important requirement for capacitors used for power leveling and ripple filtering is quick response in absorbing and releasing energy. At present, this is primarily performed by aluminum electrolytic capacitors. These are voluminous bulky components, and they fail irreparably. In other words, conventional electrolytic capacitors, such as those with a dielectric of metal oxide on a metal, are large and generally have low reliability.

Electric double layer capacitors (EDLCs), often referred to as supercapacitors or ultracapacitors, address many of the problems of conventional electrolytic capacitors. First, EDLCs can have higher capacitance per unit area compared with those conventional capacitors, often two orders of magnitude greater capacitance at the same size. EDLCs also circumvent the reliability problem common to electrolytic capacitors. The electric double layer is formed naturally at an interface when voltage is applied, and this dielectric is totally self-healing; that is, its breakdown does not mean the device is destroyed, as with conventional electrolytic capacitors. Most EDLCs are frequently used for energy storage, as well as other commercial applications where the high surface area of activated carbon allows very high capacitance. However, the small diameter and long path lengths pores result in distributed charge which limits the RC time constant to seconds and are therefore not useful for filtering applications.

Past development of EDLCs comprising vertically oriented graphene nanosheets (VOGN) on Ni substrates grown by radio frequency plasma enhanced chemical vapor deposition (RF-PECVD) has shown promising capacitive and response time resultssuitable for filtering applications (e.g., see Miller et al., "Graphene Double-Layer Capacitor with AC Line-Filtering Performance. *Science,* 2010, 329, 1637-1639; and Miller et al., "Vertically-Oriented Graphene Electric Double Layer Capacitor Designs", *J. Electrochem. Soc.,* 2015, 162, A5077-A5082). The vertical nanosheets provide a very open morphology which allows efficient ingress and egress of electrolyte corresponding to good frequency response. The density and height of sheets determines the surface area necessary to give useful specific capacitance. Although Ni (also Ta and Nb) are excellent substrates for VOGN growth because of the high solubility of carbon in those metals (which gives good ohmic contact), they are heavy and expensive.

Aluminum foil has been used for many years for electrolytic capacitors and would serve as a lighter and more affordable substrate material for fast-response, VOGN-electrode electric double layer capacitors. Unfortunately, the low solubility of carbon in aluminum and the relatively thick (2-3 nm) stable native oxide ($Al_2O_3$) covering its surface hinders VOGN growth. This causes capacitive rather than ohmic connection to the aluminum, which severely restricts the frequency response. Further, the low melting point of Al (660° C.), relative to Ni and Ta, makes it quite difficult to grow high density nanosheets by RF-PECVD.

Accordingly, there is a need for vertically oriented graphene nanosheets that can be supplied on inexpensive substrates suitable for supercapacitors.

BRIEF SUMMARY OF THE INVENTION

Compositions of vertically oriented graphene nanosheets are provided. The compositions comprise a plurality of VOGN on an aluminum substrate, the average of the plurality of VOGN having a thickness at half-height of 3 nanometers or less, wherein: (1) the plurality of carbon VOGN are aligned and stand on their edges roughly vertically to the aluminum substrate; (2) the aluminum substrate has an aluminum oxide layer, and said aluminum oxide layer is rendered sufficiently thin such that it behaves ohmically; (3) immediately adjacent to the aluminum oxide layer is a layer of horizontally oriented polycrystalline carbon; (4) said layer of horizontally oriented polycrystalline carbon has a thickness exceeding 50 nm; (5) said VOGN extend from said horizontally oriented polycrystalline carbon layer; and (6) the average height of each of the plurality of VOGN exceeds 100 nm and can exceed 10 microns.

The VOGN compositions described herein can be grown by radio frequency enhanced chemical vapor deposition (RF-PECVD), or any other methods suitable for producing the claimed compositions. Suitable growth methods (1) minimize the thickness of the surface aluminum oxide by plasma sputtering which allows acceptable ohmic contact, and (2) provide good nanosheet verticality and openness, which eliminates porous electrode behavior when the VOGN compositions are used to fabricate an electric double layer capacitor.

The VOGN compositions are useful as electrolytic capacitors, and particularly useful as EDLCs. The VOGN compositions can be further treated, for example with carbon black to enhance capacitive performance.

The VOGN compositions described herein can make advanced aluminum electrolytics commercially feasible.

DETAILED DESCRIPTION OF THE INVENTION

Figure 1:
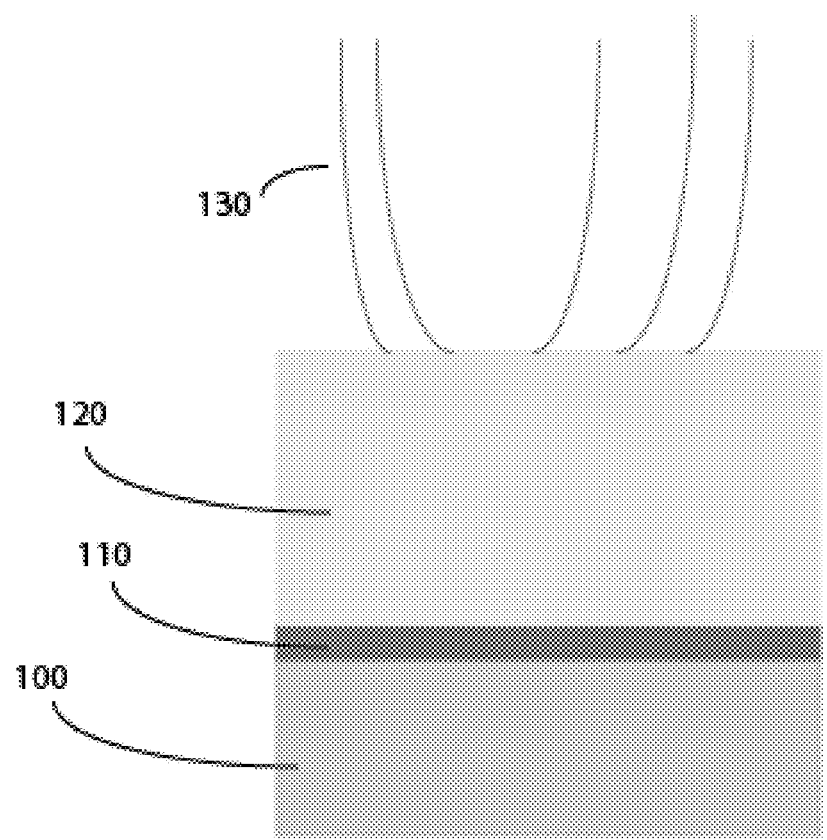
FIG. 1 is a schematic drawing of VOGN compositions described herein.

Compositions of vertically oriented graphene nanosheets ("VOGN") are provided. The compositions comprise a plurality of VOGN on an aluminum substrate, the average of the plurality of VOGN having a thickness at half-height of 3 nanometers or less: (1) wherein the plurality of VOGN are aligned and stand on their edges roughly perpendicularly to the aluminum substrate; (2) wherein the aluminum substrate has an aluminum oxide layer, and said aluminum oxide layer is sufficiently thin such that it does not prevent ohmic contact; (3) wherein immediately adjacent to the aluminum oxide layer is a polycrystalline thin film comprising carbon, (4) wherein said layer of polycrystalline carbon has a thickness exceeding 50 nm; (5) wherein said VOGN extend from said polycrystalline carbon layer; and (6) wherein the average height of each of the plurality of VOGN exceeds 100 nm and can exceed 10 microns or more.

In some embodiments, the thickness at half-height is less than 2 nm. The thickness at half-height is determined by taking the average of the smallest dimension (thickness) at the position at which a particular nanosheet is at half-height. The half-height position is determined by taking half of the vertical distance between the top of a given graphene nanosheet (i.e., its tip) and the top of the layer of polycrystalline carbon.

The aluminum oxide layer must be sufficiently thin such that it does not serve as a rectifying junction that would block the flow of charge between the carbon layer and the aluminum substrate. In typical embodiments, the thickness of the aluminum oxide layer in such conductive regions is less than 2.5 nm, and in some embodiments, less than 2 nm, and can be difficult to measure accurately. That said, ohmic contact between the aluminum substrate and the plycrystalline carbon layer is essential. Ohmic contact is defined herein as a non-rectifying electrical junction; that is, a junction between two conductors that has a linear current-voltage (I-V) curve consistent with Ohm's law.

Native aluminum oxide thicknesses on pure aluminum are often between 2.0 and 3.0 nm, depending on the processing. In one embodiment described herein, RF plasma sputtering is used to clean aluminum foil prior to growth of the VOGN. Minimizing the time interval between the aluminum oxide removal process (e.g., by RF plasma sputtering) and the VOGN growth process is important to prevent re-oxidation and ensure ohmic contact. In some embodiments, the aluminum oxide layer is interspersed with carbon.

Prior art compositions of VOGN grown on nickel substrates, which are facilitated by the high relative solubility of carbon in nickel layers, can have a relatively narrow layer of polycrystalline carbon adjacent to a nickel oxide layer, typically less than 20 nm, and often much less than 15 nm thick, depending on the feedstock gas that is used. In contrast, and unexpectedly, the VOGN compositions on aluminum described herein have a polycrystalline carbon layer with a much larger thickness of at least 50 nm, and sometimes greater than 100 nm thick, e.g., 143 nm thick.

The polycrystalline carbon layer is defined as a collection of stacked and predominantly carbon sheets wherein a line from any point on the base of a carbon sheet to any point contained by the top edge of the carbon sheet forms an angle with the plane of the substrate surface that is less than 5 degrees or more than 175 degrees. Once this angle exceeds 5 degrees and is less than 175 degrees, then at that point the carbon sheet is no longer described as being horizontally aligned or part of the polycrystalline carbon layer, but instead it becomes vertically oriented. Accordingly, the VOGN layer is described as being adjacent to the polycrystalline layer, although it could also be described as a continuum.

Vertically oriented graphene sheets can in principle be comprised purely of carbon, but some hydrogen is incorporated in the nanosheets during growth. In other embodiments, vertically oriented graphene sheets can incorporate impurities including doping agents, and/or can be coated. Suitable coating materials include, but are not limited to, for example, a metal oxide, nitride, carbide, boride, or any combination thereof to form a ternary, quaternary, etc. compound. The combinations include, for example, oxynitride, nickel oxyhydroxide, oxycarbide, boronitride, and oxynitrocarbide compounds.

Note that "vertically oriented" does not mean the graphene is absolutely perpendicular to the substrate. Rather, the graphene sheets are lifted off of the surface substrate along the top edge such that a line from any point on the base of the graphene sheet to any point contained by the top edge of the graphene sheet forms an angle with the plane of the substrate surface of between 5 and 175 degrees. In some embodiments, the vertically oriented graphene sheets are generally perpendicular to the substrate such that a line from any point on the base of the graphene sheet to any point contained by the top edge of the graphene sheet forms an angle with the plane of the substrate surface of between 70 and 110 degrees.

VOGN can be grown to heights greater than 1 micron, or greater than 10 microns, and are defined herein as requiring an average height of each of the plurality of VOGN exceeding 100 nm.

Note that the thickness of the aluminum oxide layer, the thickness of the polycrystalline carbon layer, and the height of the VOGN are all measured in the same direction, which is perpendicular to the major plane of the aluminum substrate (i.e., vertically from the base layer as depicted in schematic FIG. 1). In contrast, the thickness of a VOGN at half-height is measured along one of the axes parallel to the major plane of the aluminum substrate, and corresponds to the smallest measurement of a VOGN at that point.

FIG. 1 is a schematic drawing (not to scale) of VOGN compositions as described herein. An aluminum substrate 100 serves as the base layer, on which rests an aluminum oxide layer 110 that is sufficiently thin such that it preserves ohmic behavior. Adjacent to the aluminum oxide layer is a relative thick layer 120 of polycrystalline carbon. This polycrystalline carbon is a stacked carbon material which might also be called graphene or graphite, and it gives way to vertically oriented graphene nanosheets 130 upon continued growth.

Figure 2:
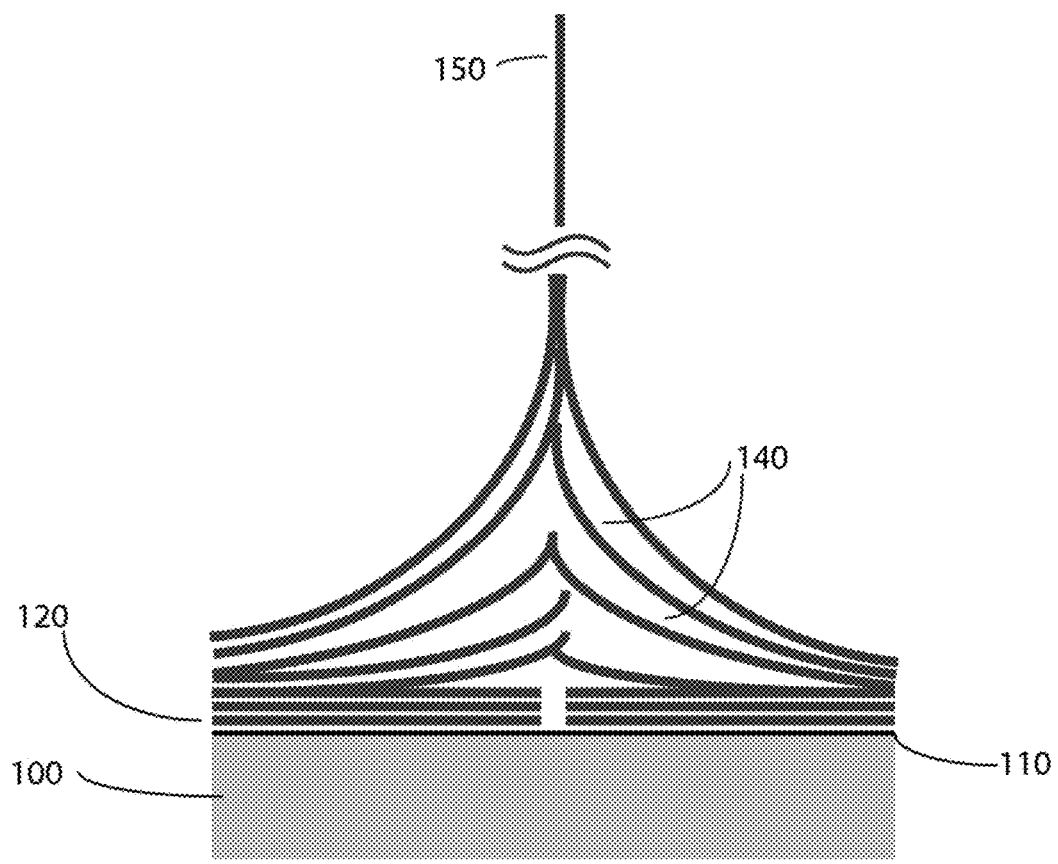
FIG. 2 is a schematic drawing of VOGN compositions described herein.

FIG. 2 is another schematic drawing (not to scale) of VOGN compositions as described herein, focusing on a single nanosheet. An aluminum substrate 100 serves as the base layer, on which rests a very thin aluminum oxide layer 110 that is sufficiently thin such that it preserves ohmic behavior. Adjacent to the aluminum oxide layer is a relative thick layer 120 of polycrystalline carbon material, which gives way to sheets of material 140 that start to curve upwards before ultimately ending in a single graphene nanosheet 150.

Figure 3:
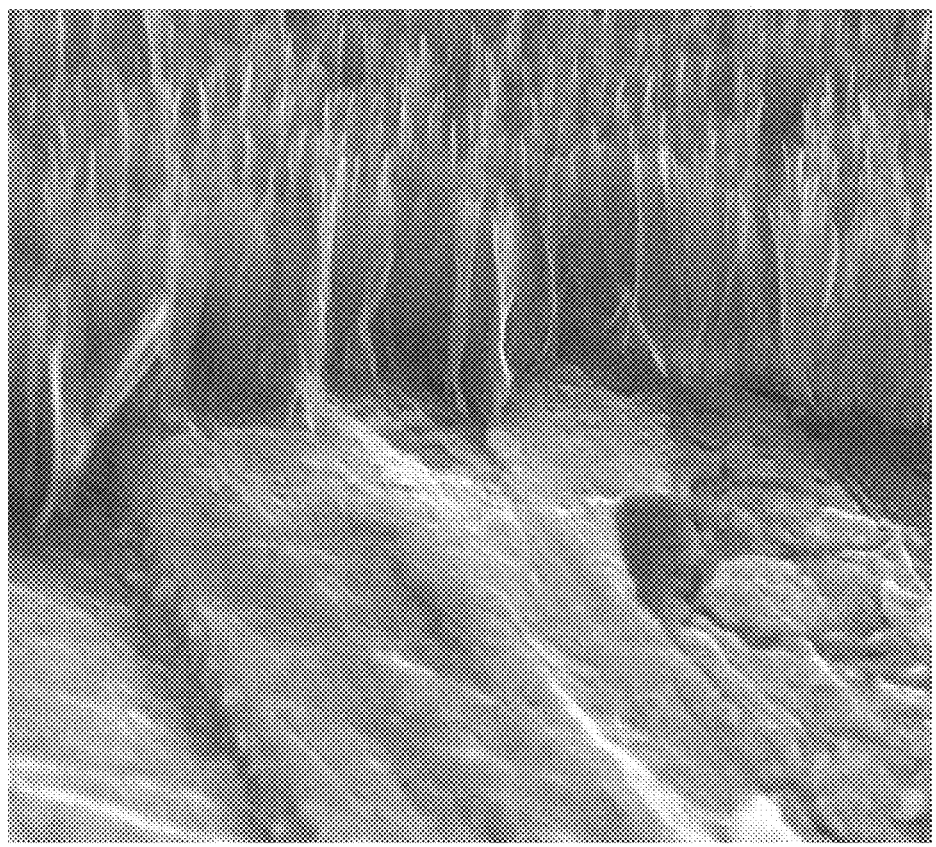
FIG. 3 is a scanning electron microscope image of VOGN compositions on aluminum foil.

FIG. 3 is an SEM image showing VOGN compositions grown on aluminum foil that can provide appropriate perspective to the schematic drawings in FIGS. 1 and 2.

The VOGN compositions are useful in a wide variety of applications, including supercapacitors, optical traps and electron field emission cathodes.

In some embodiments, VOGN compositions are used as EDLCs in accordance with prior art techniques such as those described in U.S. Pat. No. 7,852,612 and United States Patent Application Publication Nos. 20150235776, the contents of both of which are hereby incorporated by reference in their entireties.

EXAMPLES

The examples that follow are intended in no way to limit the scope of this invention but are provided to illustrate the methods of the present invention. Many other embodiments of this invention will be apparent to one skilled in the art.

Example 1

Aluminum substrates (99.99%), 0.076 mm thick and 1.9 cm in diameter, were ultrasonically cleaned in acetone and subsequently air dried. A pair of the substrates was placed on a resistance heater (rhenium-tungsten wire encapsulated in $Al_2O_3$ tubes) and covered by a two-hole tantalum mask, within an RF-PECVD growth system. The mask was placed concentrically on top of the substrates to define the 1.27 cm diameter graphene growth region and ensure the flatness of the sample for a uniform heat distribution on the substrates. After the system was evacuated to a pressure of ~1 mTorr, the system heater was adjusted to approximately 150° C. Then 6 sccm Ar/2 sccm $H_2$ was admitted into the system. Once a steady state pressure of ~100 mTorr was achieved, the plasma was initiated, increasing the substrate temperature to approximately 550° C. Operation for 10 minutes removed some of the oxide layer (thus decreasing its thickness) on the aluminum from plasma sputtering. Langmuir probe measurements show a plasma potential of approximately +24 V so the impinging ions are low energy and are not efficient in sputtering, but sufficient to remove some of the surface oxide. This can be improved by biasing the substrate negatively. The Ar and $H_2$ supply were then shutoff and, simultaneously, the VOGN growth feedstock of 7 sccm $C_2H_2$ was fed into the system without extinguishing the plasma. The time for this transition was approximately 20 seconds. This was done to minimize $Al_2O_3$ reformation on the substrates. Earlier Auger electron spectroscopy experiments with the Al heated in ultrahigh vacuum showed oxide breakup of the surface $Al_2O_3$, beginning at ~575° C. At this temperature, the initial desorption of CO was observed followed by the subsequent dissolution of the remaining surface O and C into the Al bulk at temperatures approaching and sometimes exceeding 600° C. At 620° C., virtually a completely oxide and carbon-free surface was observed. However, in this work, the ultimate pressure was only about 1 mTorr and the pressure during growth was ~10 mTorr so some re-oxidation occurs because of the high substrate temperature (620° C.) and the residual oxygen-bearing gases in the system, e.g., $H_2O$, CO, $CO_2$. The VOGN growth was continued for 10 minutes at 1100 W plasma power.

Figure 4:
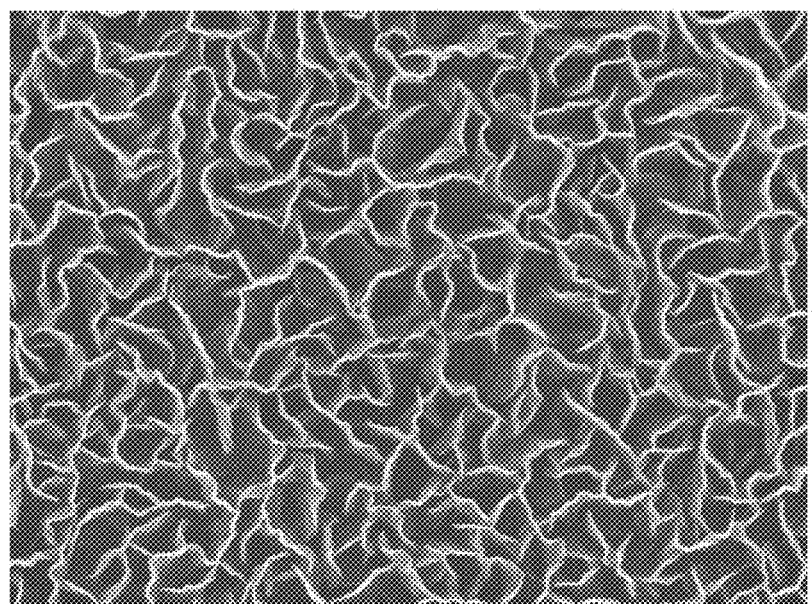
FIG. 4 is a scanning electron microscope image of VOGN compositions on aluminum.
Figure 5A:
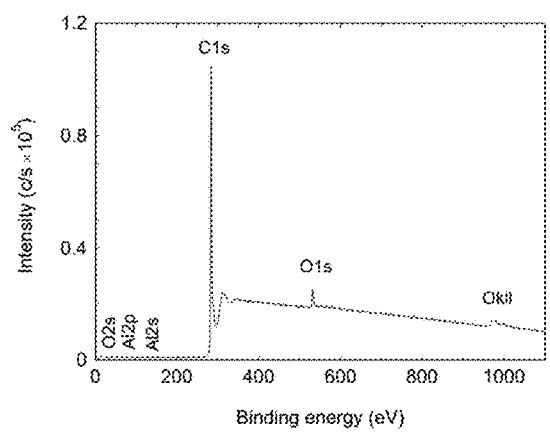
FIG. 5a is an image of the X-ray photoelectron spectroscopy (XPS) energy dispersion of X-rays (EDAX) survey of the as-received electrode shown in FIG. 4 with XPS beam.
Figure 5B:
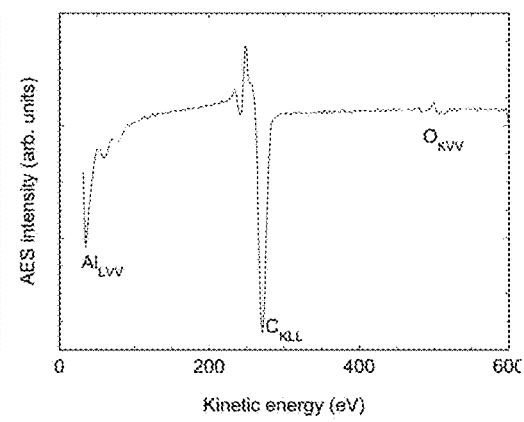
FIG. 5b is an image of the Auger electron spectroscopy (AES) survey of the VOGN film.

FIG. 4 shows the surface morphology of the VOGN on Al, obtained by Hitachi S-4700 scanning electron microscope operating at 10 kV. This shows an open, vertical and uniform structure similar to that observed previously with feedstock $C_2H_2$ or $CH_4$ on Ni substrates. The nanosheet thickness is less than 2 nm, which is slightly thicker than the growth on Ni substrates using 80% $C_2H_2$, 20% $H_2$ feedstock. Nanosheet height was approximately 1.3 μm, and yielded a (non-optimized) average specific capacitance of approximately 80 μF/cm$^2$. A longer growth time would, accordingly, yield increased capacitance. With the aforementioned conditions, a growth time of ~1 hour should give a specific capacitance approaching 500 μF/cm$^2$. FIG. 5*a* and FIG. 5*b* show the X-ray photoelectron (XPS) and Auger electron spectroscopy (AES) surveys of the VOGN film. The small oxygen signal is from the underlying surface oxide on the aluminum. No oxygen or other contaminants were observed so this represents a very pure film. The C/Al ratio corresponds well with the aforementioned nanosheet height determination.

Figure 6:
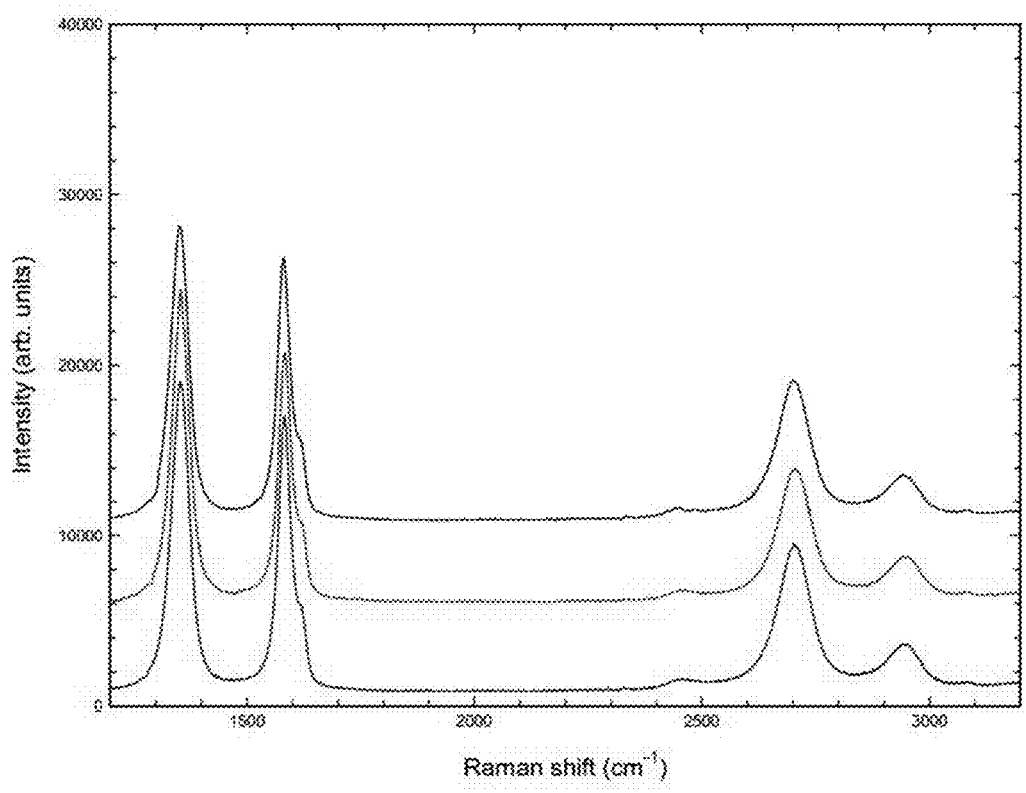
FIG. 6 is a spectroscopic image showing the Raman spectra for three different sites of a VOGN on aluminum composition.

FIG. 6 shows the corresponding Raman spectra for three different sites of the VOGN on Al surface, obtained by Renishaw InVia Raman spectroscope using a 514 nm laser. The characteristic D, G, D' and 2D peaks at 1350, 1580, 1620 and 2680 cm$^{-1}$ can be seen here with full width at half maximum (FWHM) ~40 cm$^{-1}$ for the D band and ~20 cm$^{-1}$ for the G peak. The average intensity ratio of the D peak to the G peak is ~1.1, which is higher than that observed for VOGN growth on Ni. The high defect ratio can be attributed to the Raman laser beam interacting with the underlying initial planar graphitic growth. The small nanosheet height and low density of the VOGN nanosheets allows this initial planar graphitic coating to make a significant contribution to the overall Raman signal. This planar graphene or graphite layer has a higher defect density than the growth of the vertical graphene sheets. The average grain size of the planar region is estimated to be ~15 nm.

The VOGN electrodes can be made into symmetric EDLCs and characterized for electrical performance using electrochemical impedance spectroscopy (EIS) using methods known in the prior art.

INCORPORATION BY REFERENCE

All publications, patents, and patent applications cited herein are hereby expressly incorporated by reference in their entirety and for all purposes to the same extent as if each was so individually denoted.

EQUIVALENTS

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

The articles "a" and "an" are used herein to refer to one or to more than one (i.e. to at least one) of the grammatical object of the article. By way of example, "a capacitor" means one capacitor or more than one capacitor.

Any ranges cited herein are inclusive, e.g., "between five and 175 degrees" includes 5 degrees and 175 degrees.

We claim:

1. A composition comprising: a plurality of vertically oriented graphene nanosheets on a bulk aluminum substrate;

wherein the average thickness at half-height of the plurality of vertically oriented graphene nanosheets is less than 3 nanometers;

wherein between the bulk aluminum substrate and vertically oriented graphene nanosheets is an aluminum oxide layer;

wherein adjacent to the aluminum oxide layer is a layer of polycrystalline carbon;

wherein the plurality of vertically oriented graphene nanosheets are adjacent to the layer of polycrystalline carbon;

wherein the average height of the plurality of vertically oriented graphene nanosheets is at least 100 nm;

wherein the aluminum oxide layer does not preclude ohmic contact between the polycrystalline carbon layer and the bulk aluminum substrate; and wherein the thickness of the polycrystalline carbon layer exceeds 50 nm.

2. The composition of claim 1, wherein said aluminum oxide layer additionally comprises carbon.

3. The composition of claim 1, wherein said aluminum oxide layer has a thickness of less than 3.0 nanometers.

4. The composition of claim 3, wherein said aluminum oxide layer has a thickness of less than 2.5 nanometers.

5. The composition of claim 1, wherein the average height of the plurality of vertically oriented graphene nanosheets is at least one micron.

* * * * *